United States Patent [19]

Bragole et al.

[11] 4,321,307

[45] Mar. 23, 1982

[54] LAMINATE INCLUDING POLYMERIC BODY ADHESIVELY BONDED TO IRRADIATED COATING OF PAINT

[75] Inventors: Robert A. Bragole, Danvers; Richard A. Weidman, Bedford, both of Mass.

[73] Assignee: USM Corporation, Farmington, Conn.

[21] Appl. No.: 170,284

[22] Filed: Jul. 18, 1980

[51] Int. Cl.³ .................. B32B 27/40; B29C 19/02; B05D 3/06
[52] U.S. Cl. .................. 428/423.1; 156/272; 156/331.7; 427/54.1; 428/423.9; 428/424.6; 428/425.1; 428/425.6; 428/425.8
[58] Field of Search ............ 427/44, 54.1; 156/272, 156/327, 331, 332; 428/424.6, 523, 423.1, 425.1, 423.9, 425.6, 425.8; 204/159.14, 159.15, 159.16, 159.17, 159.19

[56] References Cited

U.S. PATENT DOCUMENTS

| | | | |
|---|---|---|---|
| 3,873,640 | 3/1975 | Owston et al. | 156/331 X |
| 3,892,885 | 7/1975 | Bragole | 428/421 X |
| 4,070,398 | 1/1978 | Lu | 428/424.6 X |

*Primary Examiner*—Norman Morgenstern
*Assistant Examiner*—Thurman K. Page
*Attorney, Agent, or Firm*—John P. Morley

[57] ABSTRACT

A novel process for improving adhesion of polymeric bodies to paint coatings and substrates carrying paint coatings having the improved adhesion capability. Essentially the process involves the step of irradiating a paint coating comprising a synthetic polymer and where the coalesced residue of the paint coating has a critical surface tension of wetting of at least about 35 dynes per centimeter or less. In the preferred embodiment of the invention the paint coating is irradiated in the presence of a radiation sensitizer to increase the critical surface tension of wetting of the irradiated paint coat to about 40 dynes per centimeter or more.

11 Claims, No Drawings

LAMINATE INCLUDING POLYMERIC BODY ADHESIVELY BONDED TO IRRADIATED COATING OF PAINT

THE FIELD OF THE INVENTION

This invention relates to improved coatings of paint and to a method for improving the performance characteristics of coatings of paint.

DESCRIPTION OF THE PRIOR ART

U.S. Pat. No. 3,600,289 issued Aug. 17, 1971 to Robert A. Bragole relates to a process for improving adhesion to surfaces of a molded body of a polymeric material. The method disclosed and claimed there is particularly adaptable to molded bodies comprising substituted or non-substituted polyalkylenes such as polyethylene, polypropylene and polyvinyl fluoride among others. Essentially, surface adhesion of the body of polymeric material is improved by irradiating a selected surface(s) to generate groups reactable with an organic isocyanate.

U.S. Pat. No. 3,607,536 issued Sept. 21, 1971 to Robert A. Bragole also relates to a process for improving surface adhesion of a molded body of polymeric material. Essentially, the method involves coating (or otherwise applying) a photosensitizer and an organic isocyanate on a selected surface(s) of the body and irradiating the coated surface(s) of the body.

U.S. Pat. No. 3,619,246 issued Nov. 9, 1971 to Robert A. Bragole discloses and claims a method in which a photosensitizer is coated or otherwise applied on a surface of a molded body of a polymeric material followed by irradiation of the surface and, the application of a silane or siloxane to the irradiated surface.

U.S. Pat. No. 3,627,609 issued Dec. 14, 1971 to Robert A. Bragole relates to a method in which a surface(s) of a molded body of polymeric material is irradiated and an adhesive comprising an elastomer and a phenol aldehyde condensation product are applied to the irradiated surface.

U.S. Pat. No. 3,764,370 issued Oct. 9, 1973 to Robert A. Bragole discloses and claims a method in which a surface(s) of a molded body of polymeric material is irradiated in the presence of a photosensitizer to generate free radicals and a coating of paint is applied to the irradiated surface.

U.S. Pat. No. 3,892,885 issued July 1, 1975 to Robert A. Bragole relates to a method in which a surface(s) of a molded body of polymeric material is irradiated in the presence of a photosensitizer to generate free radicals and a paint comprising materials which can interact with the generated free radicals is applied to the irradiated surface.

The present invention is directed to an outstanding problem of improving, adjusting and/or controlling the surface performance characteristics of paint coatings comprising particular synthetic polymeric materials. As those in the art know, some conventional organic solvent based paints—particularly solvent based vehicle body paints—can be adhesively bonded to themselves and to other materials such as vinyls, glass, rubber and plastics. Accordingly, conventional adhesives such as epoxies, polyurethanes, neoprenes, polyesters etc. can usually provide effective adhesion between portions of the painted vehicle body (or other substrate) and such polymeric materials in the form of moldings, trim, stripping or the like. The adhesive capability of coatings of solvent based paints may be due to one or more of a number of different reasons. These reasons include high wetting tension of the paint coating, adhesion promoting additives in the coating and/or in the adhesive, lack of weak boundry layers or because of paint solvents in the adhesive.

For obvious reasons, the use of conventional organic solvent based paints is becoming increasingly undesirable. Instead, there is an important outstanding need in the art to develop aqueous and/or organic solvent based paints containing higher solids contents, or to develop aqueous—or primarily aqueous—based paints or to develop organic solvent-free or aqueous solvent-free paints such as powders. These paints however have been found to provide coalesced residues or coatings having low wetting tensions and/or increased resistance to solvents and/or containing no reactive bonding sites. Accordingly, the coalesced residues of the paints have fewer sites for effective adhesive bonding or otherwise lack the capability for effective adhesion to other materials such as those mentioned before.

In the past, attachment of moldings of polymeric materials to coalesced residues of such paints has involved the use of ineffective adhesives resulting in high rejection rates or the use of mechanical means such as brackets, fasteners, bolts etc. Mechanical attachment means however are relatively expensive, they complicate the assembly operation and increase potential corrosion sites as well as the overall weight of the painted substrate. These disadvantages represent serious impediments for wide-scale industrial acceptance of paints developed as substitutes for conventional organic solvent based paints particularly for example in the motor vehicle industry. This invention presents a novel, effective, relatively simple and convenient solution to the problems encountered in the art with such newly developed and much needed paints.

BRIEF SUMMARY OF THE INVENTION

This invention presents to the art novel, improved coatings of paint and a novel method for providing improved paint coatings. Essentially, the novel, improved paint coatings are obtained by applying a coating of a particular paint on or to a substrate and irradiating the applied coating—preferably in the presence of a sensitizer. The particular paints involved in the practice of this invention are those having a synthetic polymer(s) having at least some hydrogen on a carbon chain unit in the polymer backbone and the paints provide coalesced residues or coatings which have a low critical surface tension of wetting. Irradiation of coatings of the particular paints adjusts the critical surface tension of wetting to provide paint coatings of improved performance characteristics such as improved adhesion and/or improved durability of the coating.

DESCRIPTION OF PREFERRED EMBODIMENTS

The improved paint coatings of this invention are irradiated coatings—or coalesced residues—of particular synthetic polymer containing paints carried by a substrate. The particular paints are those which include a polymer (or polymers) having at least some hydrogen on a carbon chain unit in the polymer backbone (or chain). Additionally, the particular paints are those which provide a coalesced residue (or dried coating) having a critical surface tension of about 35 dynes per centimeter or slightly higher as determined by contact angle measurements (See Page 20 of "Contact Angle Wettability and Adhesives" No. 43 of the "Advances in Chemistry Science" published 1964, by the American Chemical Society. Normally However, the critical surface tension of wetting is not more than about 35 dynes per centimeter. Specific synthetic polymeric containing paints useful in the practice of this invention are paints including polymers and copolymers of lower alkyl esters of acrylic acid, methacrylic acid as well as polymers and copolymers of urethanes, epoxides, butyrates, alkyls and acrylamides among others. The amount of polymer(s) in the particular paints used to prepare coatings involved in the practice of this invention can vary over a wide range. Usually, the polymer represents at least about 25% by weight of the paint but amounts above about 40% by weight are most common and paints containing about 95% by weight polymer or somewhat higher can be employed. Polymeric powder paints for example, are contemplated for use in the practice of this invention.

The particular paints employed in the practice of this invention may and usually do contain other ingredients including those conventionally used in paints. Such ingredients include pigments such as titanium dioxide, zinc oxide, barium sulfate and carbon black among others. The amount of pigment can vary over a wide range but the most common amounts are those between about 5 to about 60% pigment by weight of the paint. Plasticizers such as phthalate alkyls or phthalate esters can also be included in the paints used in this invention in trace amounts or more commonly in amounts between about 3 to about 20% by weight of the paint. Additionally, driers, dyes, thickening agents and other ingredients well known to those in the art for providing selected properties for the paints may also be included. Again, the essential characteristics of the paint is that it include a synthetic polymer as described before and provide a coalesced residue having a low critical surface tension of wetting which presents a coating surface having an ineffective adherent capability for conventional adhesives.

The coalesced residue or dried coating of the paints of this invention have significantly different properties from paint coatings used in the art before, particularly from paint coatings used in the motor vehicle industry. The coalesced residue of paints of this invention comprise highly crosslinked, usually very high molecular weight polymers together with pigments plasticizers and other ingredients such as those mentioned before. Additionally, the residues or coatings are extremely resistant to solvents, have low wetting tensions and have a hydrocarbon or paraffinic character as determined by scanning electron microscopy. In other words, electron scanning detects carbon and hydrogen as the predominate ingredients present at the surface of the coating.

The essential steps in preparing the novel, improved paint coatings of the invention involve applying a paint of the type described before to a substrate and irradiating the paint coating carried by the substrate. Preferably the paint coating is at least partially dry when irradiated. In the especially preferred embodiments of the invention the radiation dosage is sufficient to increase the critical surface tension of wetting of the irradiated paint coating by at least about 5 and preferably at least about 10 dynes per centimeter over the critical surface of tension of the non-irradiated coating. Suitable sources of activating radiation are those which can increase the critical surface tension of wetting of the paint coating but ultraviolet radiation is definitely preferred. Particularly suitable ultraviolet radiation is radiation at a wave length of from about 2000 to about 3500 A and especially from about 2000 to about 2800 A. Suitable ultraviolet radiation dosages are between 0.01–1.0 Joules/cm$^2$ when measured at 3650 A and preferably between about 0.1 to about 0.2 Joules/cm$^2$. The paint coating may be irradiated continually over a preselected period of time or irradiated intermittently for incremental periods of a preselected time. For example, the coating may be continuously irradiated for about 80 seconds or it may be subjected to four irradiations for about 20 seconds each. Irradiation for incremental periods of time minimizes thermal build-up during irradiation and can be employed if thermal build-up should be a consideration of importance. Ultraviolet irradiation suitable for the practice of the invention has been obtained using commercially available 25 inch, high intensity medium pressure mercury vapor lamps which operate at about 200 watts/linear inch.

In accordance with one aspect of this invention, the painted coating carried by the substrate is irradiated in the presence of a radiation photosensitizer. In the preferred embodiment of this aspect of the invention, ultraviolet radiation photosensitizers are preferred. The ultraviolet radiation photosensitizers increase the effectiveness of the ultraviolet radiation and suitable photosensitizers include materials such as benzophenone, acetophenone, benzoin, 2-acetonaphone, acenapthene, fluorene, anthrone, para-chlorobenzophenone, benzil and other known photosensitizers or mixtures of sensitizers, e.g. benzophenone and benzil or benzophenone and anthrone, etc. Considerations involved in selecting a suitable photosensitizer include such factors as a melting point which can prevent excessive volatilization before irradiation, safety, solubility in conventional and commercially available solvents, cost and availability.

Any manner for integrating the photosensitizer with the paint coating for irradiation can be employed so long as sufficient photosensitizer will be present to increase the effectiveness of the irradiation. Generally, the photosensitizer is applied to the paint coating in the form of a solution in a volatile solvent in the case of a solid photosensitizer or as a pure or diluted solution in the case of liquid photosensitizer. Methylene chloride is a particularly preferred solvent or diluent. The solution may be sprayed, wiped or otherwise applied to the paint coating and most commonly the amount of photosensitizer in the solution is about 0.5 to about 15% by weight and preferably about 1 to about 5% by weight. Alternatively, the photosensitizer can be included in the paint and the paint-sensitizer mixture applied to the substrate. However if this method is used, the photosensitizer is preferably included in the paint just prior to the application of the paint-sensitizer mixture to the substrate; otherwise, higher melting photosensitizers should be used.

The improved paint coatings of this invention are carried by a substrate which can include rubber, metals, glass, ceramics, plastics, wood etc. It should be understood that "carried" does not necessarily mean that the improved paint coating is coated directly on the substrate. Other materials such as coatings of paint and primer for example may or may not be positioned between the improved paint coating and the substrate. In the particularly preferred embodiment of this invention, the substrate is metal since the invention is especially adaptable for improving exterior paint coatings of motor vehicles. In this embodiment, at least selected portions—but preferably all—of the body of the painted vehicle is irradiated usually after photosensitizer has been applied to portions of all of the body of the painted vehicle. After irradiation, materials in the form of moldings, trim, stripping etc. can be effectively bonded to the irradiated paint coating with conventional adhesives particularly polyurethane adhesives. For example, vinyl moldings can be effectively bonded to the irradiated paint coating using polyurethane based adhesives. A special advantage of irradiating all of the body of the painted motor vehicle is that irradiation can improve the durability of the paint providing improved resistance to attack by solvents and salt and degradation by sunlight etc. This improvement in the overall durability of the paint is especially apparent when the paint coating is irradiated in the presence of sensitizer.

Preferred adhesives for bonding trim, molding or stripping to the irradiated paint coatings are polyurethane adhesives. Particularly preferred polyurethane adhesives are those comprising prepolymers provided by reacting an aliphatic or aromatic diisocyanate with polyether diols and triols. Especially preferred are polyurethanes comprising prepolymers provided by reacting methylene bis-(4-phenylisocyanate) with polyether diols and triols selected to provide adhesive products of desired performance characteristics such as elasticity, toughness, etc. The prepolymers can be prepared by way of a one-step or two-step reaction. In the two-step reaction, diol is first reacted with the diisocyanate to provide an intermediate which is chain extended with the triol. The prepolymers produced by way of a one or two-step reaction are isocyanate terminated and the prepolymers are compounded with other ingredients such as plasticizers and fillers to provide urethane adhesive compositions. These urethane adhesive compositions cure by reaction with moisture to provide cured flexible adhesives with thermosetting characteristics. Preferred polyether diols used in providing methylene bis-(4-phenylisocyanate) containing prepolymers are diols prepared from polyethylene glycol and/or polypropylene glycol with typical molecular weights of the diols in the range of about 1500 to about 3000. Preferred polyether triols used in providing methylene bis-(4-phenylisocyanate) containing prepolymers are those having a molecular weight in the range of about 3500 to about 5500 and which are prepared by the reaction of ethylene and/or propylene oxide with a triol such as trimethylol propane. Prepared prepolymers are those having a diol/triol ratio in the range between about 2/1 to about 4/1 and a NCO/OH ratio in the range between about 1.4 to about 2.0. The ingredients and concentration of ingredients of preferred urethane adhesive compositions particularly useful for bonding vinyl moldings and the like to irradiated paint coatings of the invention are described below:

| INGREDIENTS | % BY WEIGHT |
|---|---|
| Diisocyanate, Diol, Triol Prepolymer | 30–50 |
| Reinforcing Filler e.g. carbon black | 10–30 |
| Inert Fillers e.g. silica, silicates etc. | 10–40 |
| Solvents e.g. toluene, methyl ethyl ketone etc. | 0–5 |
| Plasticizers e.g. aromatic and/or aliphatic phthalate type | 10–20 |
| Catalysts e.g. heavy metal type | 0.1–2 |

The invention and manners of making and using it will be more fully appreciated from the following Examples presented to illustrate and not to limit the invention.

In the following Examples, the adhesive properties of coatings of motor vehicle paints applied to metal substrates were evaluated. The evaluation involved determining the bonding strength between a polyurethane adhesive layer coated on a surface of a vinyl chloride strip and the paint coating by standard pluck, break, peel and bond failure measurements. The vinyl strips carrying the polyurethane adhesive layer were 0.625"×6", and 0.25" thick and had a bead of polyurethane adhesive 0.078" in diameter coated on its surface. Also a dual film primer, such as Bostik 10-178-3 and two beads of a hot melt, pressure sensitive adhesive, 0.060" in diameter were applied to the vinyl strip in addition to the bead of polyurethane adhesive. The function of the hot melt, pressure sensitive adhesive is to assist adhesion until the polyurethane adhesive is sufficiently cured and also to control spreading of the polyurethane adhesive beyond the edges of the vinyl strip. In making the bond strength measurements, a portion of the surface of the vinyl strip carrying the polyurethane adhesive layer is pressed against the paint coating using a seven pound rubber roller leaving a portion (1") of the vinyl strip extending beyond the edge of the painted substrate. The portion (1") of the vinyl strip extending beyond the edge permits effective break and peel measurements to be made. Part of the vinyl strip that is bonded to the paint substrate, not extending beyond the edge, permits the pluck test to be made. The type of bond failure can be assessed after these three measurements are made.

Four different polyurethane adhesive compositions were used in the following Examples for bonding vinyl strips to the painted coatings. Table I lists the ingredients in parts per hundred of the polyurethane adhesive compositions used.

TABLE I

| | Polyurethane Adhesive Compositions | | | |
|---|---|---|---|---|
| Adhesive No. | 5206-11 | 5206-13 | 5206-55 | 5206-56 |
| Prepolymer 5206-4 | — | 65.10 | 65.10 | 64.52 |
| Additive Ti (p-toluene sulfonyl isocyanate) | 0.03 | 0.03 | 0.03 | 0.03 |
| Carbon Black | 12.35 | 12.35 | 22.00 | 21.80 |
| Aluminum Silicate | 13.56 | 13.56 | 9.00 | 8.92 |
| Calcium Oxide | 5.57 | 5.57 | 3.31 | 3.28 |
| Diphenyl mercury dodecenyl succinate | 0.71 | 0.71 | 0.10 | 0.99 |
| Lead Octoate 24% | — | — | 0.04 | 0.04 |
| Dimethyl piperazine | — | — | 0.42 | 0.42 |
| Methyl Ethyl Ketone | 1.34 | 2.68 | — | — |
| Toluol | 1.34 | — | — | — |
| Prepolymer 5206-5 | 65.10 | — | — | — |
| Theoretical % NCO | 1.17 | 1.19 | 0.68 | 0.67 |

Table II below lists the approximate viscosities of the Polyurethane Adhesive Compositions of Table I. The viscosities are the Castor-Severs viscosities measured through an 0.104 in. orifice at 20–40 psi.

TABLE II

| ADHESIVE NO. | VISCOSITY |
|---|---|
| 5206-11 | 300–350 sec.* |
| 5206-13 | 200–250 sec.* |
| 5206-55 | 600–650 sec.* |
| 5206-56 | 650–700 sec.* |

*Castor-Severs viscosities through 0.104 in. orifice at 20–40 psi.

In the following Examples, the paint coatings irradiated according to the present invention were exposed to a high intensity, medium pressure mercury arc lamp operating at a power consumption of 200 watts/linear inch. The arc lamp was 25 inches long and arranged with a lurium reflector approximately 30 inches long and 6 inches wide for highly efficient reflection of the ultra-violet radiation to the paint coatings. A variable speed conveyor belt was positioned about 6 to 7 inches from the arc lamp to carry the coated substrate under the lamp for irradiation for the time indicated. In some of the following Examples, paint coatings were treated with ultra-violet sensitizers prior to exposure to the arc lamp. In those cases, a solution of the sensitizer(s) in a volatile solvent—usually methylene chloride—was sprayed on the surface of the paint coating with an air gun using about 30–50 pounds pressure. The sensitizer solvent was at least partially evaporated and the treated paint coating was exposed to the arc lamp usually within at least about 30 minutes after being sprayed. When necessary, surfaces of the paint coatings were cleaned using non-solvent materials for the paint.

The pluck, break, and peel, as well as bond failure assessment, of the following Examples were made according to procedures well known in the art. These procedures are described in detail in Fisher Body Material Specification 11-26. This specification involves the adhesion requirements for urethane adhesive attachment of flexible exterior plastic moldings. Adhesive is applied and the surface of the applied adhesive composition layer.

EXAMPLE I

This Example involves an evaluation of adhesive properties of surfaces of paint coatings provided by a white non-metallic water based enamel having the following analyzed composition:

| | |
|---|---|
| Alkylated melamine formaldehydes and styrenated hydroxyl acrylics | 62% by wt. |
| Pigments | 38% by wt. |

Wetting tension measurements in Table III and all following Tables were obtained using a kit supplied by Pillar Corp. This consists of a series of cellulose acetate/formamide solutions varying in surface tension between 34 and 44 dynes/cm. A 1 sq. in. area of the paint surface was covered with these solutions with a "Q-tip". If the solution "beads" within 2 seconds, the surface tension of the substrate in question is lower than the surface tension value of the solution. If the film remains continuous for 2 seconds, or more, the surface tension value of the solution indicates the minimum surface tension of the substrate. In that case, one proceeds to the next highest surface tension solution and the tests are repeated until the exact value found.

Table III presents the evaluation results.

TABLE III

ADHESIVE PROPERTIES OF WHITE NON-METALLIC WATER BASED ENAMEL PAINT SURFACES

| SAMPLE | SURFACE TREATMENT SENSITIZER | SURFACE TREATMENT IRRADIATION (secs) | WETTING TENSION (dynes/cm.) BEFORE | WETTING TENSION (dynes/cm.) AFTER | POLYURETHANE ADHESIVE (TABLE I) | PLUCK (lbs) | BREAK (lbs) | PEEL (lbs) | BOND FAILURE |
|---|---|---|---|---|---|---|---|---|---|
| 1 | None | None | 35 | — | 5206-56 | 82 | 32 | 5 | Adhesive |
| 2 | Sprayed with 4% benzophenone in methylene chloride | 30 sec. (using 2-15 sec. irradiations) | 35 | 44[1] | 5206-56 | 114 | 45 | 23 | Cohesive |
| 3 | Sprayed with 4% benzophenone in methylene chloride | 30 sec. (using 2-15 sec. irradiations) | 35 | 44[1] | 5206-55 | 112 | 40 | 25 | Cohesive |

[1]Minimum value observed, some higher values observed.

bonds of acceptable performance characteristics usually require a pluck value of 90 or greater, a break value of 20 or greater and a peel value of 15 or greater. Also, it is very important that the bond failure be "cohesive" rather than "adhesive". In "cohesive" failure, the adhesive composition remains bonded to the surface to which it was applied and the bond is broken within the interstices of the adhesive composition layer itself. However, in "adhesive" failure, the bond is broken between the surface to which the adhesive composition is applied and the surface of the applied adhesive composition layer.

EXAMPLE 2

This Example involves an evaluation of adhesive properties of surfaces of paint coatings provided by a white, non-metallic, non-aqueous dispersion having the following analyzed composition:
Phthalate alkyls or phthalate esters—4.4% by wt.
Polymethylmethacrylate—44.5% by wt.
Pigments (TiO$_2$ and Ba SO$_4$)—53.1% by wt.
Table IV presents the evaluation results.

TABLE IV

ADHESIVE PROPERTIES OF WHITE NON-METALLIC, NON-AQUEOUS DISPERSION PAINT SURFACES

| SAMPLE | SURFACE TREATMENT SENSITIZER | SURFACE TREATMENT IRRADIATION (secs) | wetting TENSION (dynes/cm.) BEFORE | wetting TENSION (dynes/cm.) AFTER | POLYURETHANE ADHESIVE (TABLE I) | PLUCK (lbs) | BREAK (lbs) | PEEL (lbs) | BOND FAILURE |
|---|---|---|---|---|---|---|---|---|---|
| 4 | None | None | 36 | — | 5206-11 | 96 | 38 | 5 | Adhesive |
| 5 | Sprayed with 2.5% benzophenone in methylene | 30 sec. (using 2-15 sec. irradiations) | 36 | 44[1] | 5206-11 | 153 | 54 | 21 | Cohesive |

TABLE IV-continued

| | ADHESIVE PROPERTIES OF WHITE NON-METALLIC, NON-AQUEOUS DISPERSION PAINT SURFACES | | | | | | | | |
|---|---|---|---|---|---|---|---|---|---|
| | SURFACE TREATMENT | | wetting TENSION (dynes/cm.) | | POLYURETHANE | | | | |
| SAM-PLE | SENSITIZER | IRRADIATION (secs) | BEFORE | AFTER | ADHESIVE (TABLE I) | PLUCK (lbs) | BREAK (lbs) | PEEL (lbs) | BOND FAILURE |
| 6 | None 80 sec. chloride | 36 (using 4-20 sec. irradiations) | 44[1] | 5206-11 | 135 | 36 | 15 | | Cohesive |
| 7 | None | None | 36 | — | 5206-13 | 92 | 35 | 6 | Adhesive |
| 8 | Sprayed with 2.5% benzopheone in methylene chloride | 30 sec. (using 2-15 sec. irradiations) | 36 | 44[1] | 5206-13 | 150 | 50 | 22 | Cohesive |

[1] = Minimum value observed; some higher values observed.

EXAMPLE 3

This Example involves an evaluation of adhesive properties of surfaces of paint coatings provided by a blue, non-metallic, non aqueous dispersion having the following analyzed composition:
Phthalate alkyls or phthalate esters—13% by wt.
Polymethylmethacrylate—43% wt.
Pigments ($TiO_2$ and $BaSO_4$)—44% by wt.
Table V presents the evaluation results.

EXAMPLE 6

This Example involves an evaluation of adhesive properties of surfaces of paint coatings provided by the paint of Example 5. In this Example however the sensitizer sprayed coatings were heated at 110° F. for thirty minutes before irradiation.
Table VI presents the evaluation results.

TABLE V

| | ADHESIVE PROPERTIES OF BLUE, NON-METALLIC, NON-AQUEOUS DISPERSION PAINT SURFACES | | | | | | | | |
|---|---|---|---|---|---|---|---|---|---|
| | SURFACE TREATMENT | | WETTING TENSION (dynes/cm.) | | POLYURETHANE | | | | |
| SAM-PLE | SENSITIZER | IRRADIATION (secs) | BEFORE | AFTER | ADHESIVE (TABLE I) | PLUCK (lbs) | BREAK (lbs) | PEEL (lbs) | BOND FAILURE |
| 9 | None | None | 34 | — | 5206-13 | 88 | 32 | 5 | Adhesive |
| 10 | Sprayed with 4% 3/1 mixture of benzophenone and benzil in methylene chloride | 30 sec. (using 2-15 sec. irradiations) | 34 | 44[1] | 5206-13 | 141 | 52 | 31 | Cohesive |
| 11 | Sprayed with 4% 1/1 mixture of benzophenone and benzil in methylene chloride | 30 sec. (using 2-15 sec. irradiations) | 34 | 44[1] | 5206-13 | 140 | 62 | 28 | Cohesive |
| 12 | Sprayed with 4% benzil in methylene chloride | 30 sec. (using 2-15 sec. irradiations) | 34 | 44[1] | 5206-13 | 136 | 56 | 30 | Cohesive |
| 13 | Sprayed with 4% 3/1 mixture of benzophenone and anthrone in methylene chloride | 30 sec. (using 2-15 sec. irradiations) | 34 | 44[1] | 5206-13 | 141 | 52 | 31 | Cohesive |
| 14 | Sprayed with 4% 1/1 mixture of benzophenone and anthrone in methylene chloride | 30 sec. (using 2-15 sec. irradiations) | 34 | 44[1] | 5206-13 | 123 | 55 | 28 | Cohesive |
| 15 | Sprayed with 4% anthrone in methylene chloride | 30 sec. (using 2-15 sec. irradiations) | 34 | 44[1] | 5206-13 | 121 | 57 | 26 | Cohesive |

[1] = minimum value observed; some higher values observed.

TABLE VI

ADHESIVE PROPERTIES OF BLUE, NON-METALLIC, NON-AQUEOUS DISPERSION PAINT SURFACES

| SAMPLE | SURFACE TREATMENT SENSITIZER | IRRADIATION (secs) | WETTING TENSION (dynes/cm.) BEFORE | WETTING TENSION (dynes/cm.) AFTER | POLYURETHANE ADHESIVE (TABLE I) | PLUCK (lbs) | BREAK (lbs) | PEEL (lbs) | BOND FAILURE |
|---|---|---|---|---|---|---|---|---|---|
| 16 | Sprayed with anthrone in methylene chloride | 30 sec (using 2-15 sec. irradiations) | 34 | 44[1] | 5206-13 | 108 | 55 | 26 | Cohesive |
| 17 | Sprayed with 4% 1/1 mixture of benzophenone and anthrone in methylene chloride | 30 sec. (using 2-15 sec. irradiations) | 34 | 44[1] | 5206-13 | 122 | 59 | 24 | Cohesive |
| 18 | Sprayed with 4% benzil in methylene chloride | 30 sec. (using 2-15 sec. irradiations) | 34 | 44[1] | 5206-13 | 136 | 66 | 24 | Cohesive |
| 19 | Sprayed with 4% 1/1 mixture of benzophenone and benzil in methylene chloride | 30 sec. (using 2-15 sec. irradiations) | 34 | 44[1] | 5206-13 | 142 | 60 | 29 | Cohesive |

[1] = minimum value observed; some higher values observed.

Having described our invention together with manners of making and using it, what we claim is as follows:

1. A laminate consisting essentially of a substrate carrying a coating of paint which is provided by a paint comprising a synthetic polymer having at least some hydrogen on a carbon chain and the coalesced residue of the paint has a critical surface tension of wetting of about 35 dynes per centimeter or less and where the coating of paint is irradiated to increase said critical surface tension of wetting by at least about 5 dynes per centimeter and a polymeric body bonded to said irradiated paint coating by a polyurethane adhesive.

2. A laminate of claim 1 where the paint coating is irradiated to increase the critical surface tension of wetting to at least about 40 dynes per centimeter.

3. A laminate of claim 1 where the irradiated coating includes an irradiated residue of a sensitizer.

4. A laminate of claim 1 where the polymeric body comprises a polyvinyl chloride.

5. A laminate consisting essentially of a substrate carrying a coating of paint which is provided by a paint comprising a synthetic polymer having at least some hydrogen on a carbon chain and the coalesced residue of the paint has a critical surface tension of wetting of about 35 dynes per centimeter or less and where the coating of paint is irradiated to increase said critical surface tension of wetting to at least about 40 dynes per centimeter and a polymeric body comprising a polyvinyl chloride bonded to said irradiated paint coating by a polyurethane adhesive.

6. A process for bonding a polymeric body to a substrate carrying a coating of paint which is provided by a paint comprising a synthetic polymer having at least some hydrogen on a carbon chain and a coalesced residue of the paint has a critical surface tension of wetting of about 35 dynes per centimeter or less which consists essentially of the steps of:
   (a) irradiating the coating of paint to increase the critical surface tension of wetting by at least about 5 dynes and,
   (b) bonding a polymeric body to said irradiated coating of paint by a polyurethane adhesive.

7. A process of claim 6 where the coating is irradiated so that the critical surface tension of wetting of the irradiated coating is at least about 40 dynes per centimeter.

8. A process of claim 6 where the coating is irradiated in the presence of a radiation sensitizer.

9. A process of claim 6 where the polymeric body bonded to said irradiated paint coat comprises a polyvinyl chloride.

10. A process for bonding a polymeric body to a substrate carrying a coating of paint which is provided by a paint comprising a synthetic polymer having at least some hydrogen on a carbon chain and a coalesced residue of the paint has a critical surface tension of wetting of about 35 dynes per centimeter or less which consists essentially of the steps of:
    (a) irradiating the coating of paint to increase the critical surface tension of wetting to at least about 40 dynes per centimeter and,
    (b) bonding a polymeric body comprising a polyvinyl chloride to said irradiated coating of paint by a polyurethane adhesive.

11. A process of claim 10 where the coating is irradiated in the presence of a radiation sensitizer.

* * * * *